(12) United States Patent
Rapp

(10) Patent No.: US 6,798,363 B2
(45) Date of Patent: Sep. 28, 2004

(54) METHOD FOR COMPENSATING AN OFFSET IN AN ASYMMETRIC REPRODUCTION SIGNAL

(75) Inventor: Stefan Rapp, Schramberg (DE)

(73) Assignee: Thomson Licensing, S.A., Boulogne-Billancourt (FR)

(*) Notice: Subject to any disclaimer, the term of this patent is extended or adjusted under 35 U.S.C. 154(b) by 0 days.

(21) Appl. No.: 10/667,032

(22) Filed: Sep. 22, 2003

(65) Prior Publication Data

US 2004/0075595 A1 Apr. 22, 2004

(30) Foreign Application Priority Data

Oct. 8, 2002 (EP) .............................................. 02022559

(51) Int. Cl.$^7$ ................................................ H03M 7/00
(52) U.S. Cl. .......................... 341/59; 341/58; 360/44; 360/46; 360/53; 369/44.27; 369/44.25
(58) Field of Search ....................... 341/58, 59; 360/44, 360/46, 53; 369/44.27, 44.2

(56) References Cited

U.S. PATENT DOCUMENTS

| | | | |
|---|---|---|---|
| 5,508,993 A | | 4/1996 | Hayashi et al. |
| 5,737,369 A | * | 4/1998 | Retzer ........................ 375/346 |
| 5,790,335 A | | 8/1998 | Sugawara et al. |
| 5,812,334 A | * | 9/1998 | Behrens et al. ............... 360/40 |
| 5,844,509 A | * | 12/1998 | Behrens et al. ............... 341/58 |
| 5,844,738 A | * | 12/1998 | Behrens et al. ............... 360/44 |
| 5,867,331 A | * | 2/1999 | Behrens et al. ............... 360/40 |
| 5,901,128 A | | 5/1999 | Hayashi et al. |
| 6,324,144 B1 | | 11/2001 | Won et al. |
| 6,459,152 B1 | * | 10/2002 | Tomita et al. .............. 257/738 |
| 2002/0060596 A1 | | 5/2002 | Shim et al. |

FOREIGN PATENT DOCUMENTS

WO 96/18189 6/1996

OTHER PUBLICATIONS

B. Derras, IEEE Transactions on Consumer Electronics, IEEE Inc, New York, vol. 47, No. 3, Aug. 2001, "Decision–Directed Adaptive Nonlinear Canceller for Optical Read Channels", pp. 520–527.
Search Report for EPO Patent Appln. 02022559.5 dated Apr. 16, 2003.

* cited by examiner

*Primary Examiner*—Michael Tokar
*Assistant Examiner*—Lam T. Mai
(74) *Attorney, Agent, or Firm*—Joseph S. Tripoli; Reitseng Lin

(57) ABSTRACT

The present invention relates to a method for compensating asymmetry in a reproduction signal DRSO from an optical recording medium, and to an apparatus for reading from and/or writing to optical recording media using such method. It is an object of the invention to propose a method for compensating an offset in an asymmetric reproduction signal DRSO capable of compensating the offset even if the amplitude of the shortest run-length components is smaller than the asymmetry of the reproduction signal DRSO. This object is achieved by a method for compensating an offset in an asymmetric reproduction signal, whereby an offset compensation signal OFS is subtracted from the reproduction signal DRSO, the offset compensation signal OFS being generated by an offset compensator 11, comprising the steps of:

detecting a binary data signal NRZ from the asymmetric reproduction signal DRSO; and using the binary data signal NRZ for obtaining the offset compensation signal OFS.

13 Claims, 3 Drawing Sheets

METHOD FOR COMPENSATING AN OFFSET IN AN ASYMMETRIC REPRODUCTION SIGNAL

FIELD OF THE INVENTION

The present invention relates to a method for compensating asymmetry in a reproduction signal from an optical recording medium. The invention further relates to an apparatus for reading from and/or writing to optical recording media using such method.

BACKGROUND OF THE INVENTION

For high data storage densities on optical recording media, the modulation transfer function drops very steeply. The high frequency components of the analog reproduction signal are, therefore, attenuated considerably compared to the low frequency components. In case of a blu-ray disk (BD), which is currently under development, with a storage capacity of about 25 gigabytes, the shortest run-length components (2T) are attenuated by a factor of more than 20 dB compared to the longest run-length components (8T). This results in a large amount of inter-symbol interference. The eye-pattern, i.e. the high frequency signal obtained by summing the output signals of a photodetector array used in an apparatus for reading from and/or writing to optical recording media ("reproduction signal") is even without noise nearly closed. Furthermore, the reproduction signal is also non-linear, which results in a strong asymmetry of the eye-pattern. This can, inter alia, be caused by non-optimum recording conditions like an excessive write power, leading to different lengths of marks and spaces on the optical recording medium. The amount of this asymmetry can be larger than the amplitude of the shortest run length signal.

For a reliable data detection, the mid-level signal, which is necessary for further processing of the reproduction signal, has to be placed exactly in the middle of the shortest run-length component of the reproduction signal. This can be achieved by subtracting an offset compensation signal, which is generated by an offset compensator, from the reproduction signal.

Such a solution is, for example, disclosed in the U.S. Pat. 6,324,144. The document shows an apparatus for correcting asymmetry existing in a reproduction signal by processing the reproduction signal in digital form. An analog-to-digital converter converts the analog reproduction signal to a digital reproduction signal. A predetermined asymmetry compensation signal is then added to the digital signal to obtain an asymmetry compensated signal. Finally, a binary non-return-to-zero-inverted (NRZI) data signal is detected from the asymmetry compensated signal. This binary data signal is output by the apparatus. For determining the asymmetry compensation signal, the zero crossing points of the digital reproduction signal are detected. The zero crossing points are needed for controlling a sign bit counting operation, which is used for controlling an asymmetry corrector.

The solution disclosed in the document, which has been developed for DVD-RAM where the shortest run-length is 3T, has the disadvantage that the detection of zero crossing points cannot be reliably performed if the amplitude of the shortest run-length components is smaller than the asymmetry of the reproduction signal. In this case the shortest run-length components are nearly vanishing in the noise floor and the zero crossing points cannot easily be detected.

It is, therefore, an object of the invention to propose a method for compensating an offset in an asymmetric reproduction signal capable of compensating the offset even if the amplitude of the shortest run-length components is smaller than the asymmetry of the reproduction signal, i.e. if the detection of zero crossing points is not possible for the shortest run-length components.

SUMMARY OF THE INVENTION

According to the invention, this object is achieved by a method for compensating an offset in an asymmetric reproduction signal, whereby an offset compensation signal is subtracted from the reproduction signal, the offset compensation signal being generated by an offset compensator, comprising the steps of:

detecting a binary data signal from the asymmetric reproduction signal; and using the binary data signal for obtaining the offset compensation signal.

Using the binary data signal, which only assumes two discrete values, for obtaining the offset compensation signal has the advantage that the offset compensation signal can be obtained with a much higher reliability compared with the digital reproduction signal, which assumes a plurality of discrete values. Even when a detection of zero crossing points is not possible, the offset compensation signal can still be obtained.

Favorably, the method further comprises the step of detecting the shortest run-length components of the binary data signal for obtaining the offset compensation signal. Since the shortest run-length components are most affected by the asymmetry of the reproduction signal, it is sufficient to use only these components for obtaining the offset compensation signal. In this case, every time a shortest run-length component is detected, an enable signal is generated for enabling the offset compensation. Of course, it is also possible to detect signal components with another run-length and to generate the respective enable signal. A secure run-length detection based on the digital reproduction signal as as known from prior art, i.e. before detecting the binary data signal, is not possible if the amplitude of the shortest run-length components is smaller than the asymmetry of the reproduction signal.

Advantageously, the method further comprises the step of delaying the asymmetric reproduction signal before obtaining the offset compensation signal and/or before subtracting the offset compensation signal from the reproduction signal. This allows to compensate for the processing delay caused by the detection of the binary data signal from the asymmetric reproduction signal and by the run-length detection, so that the enable signal, and correspondingly the asymmetry compensation signal, coincides exactly with the shortest run-length samples of the reproduction signal. Delaying the asymmetric reproduction signal can, for example, be performed by a register chain.

Favorably, the method further comprises the step of centering the asymmetric reproduction signal with regard to a digital zero before detecting the binary data signal. This centering is, for example, performed by passing the reproduction signal through a slicer. Centering the asymmetric reproduction signal without compensating the offset is sufficient for a reliable run-length detection until the offset compensation has settled to a final offset compensation signal.

Advantageously, a partial response maximum likelihood detector or a bit-by-bit detector is used for detecting the binary data signal. Both detectors deliver a non-return-to-zero (NRZ) data stream at their output, which can be used for obtaining the asymmetry compensation signal. While the partial response maximum likelihood detector, e.g. a partial response equalizer in combination with a Viterbi detector, delivers a lower bit error rate and has a higher performance, the bit-by-bit detector is less expensive and simplifies the necessary delay of the reproduction signal samples.

According to a further refinement of the invention a plurality of run-lengths of the binary data signal are detected for obtaining run-length dependent offset compensation signals and enabling the offset compensation accordingly. For each signal sample the offset compensation signal corresponding to the run-length of the signal sample is used for offset compensation. In this way, the offset is not only compensated for the shortest run length, but selectively also for other run-lengths, which are allowed by the channel modulation, leading to an even more reliable data detection and hence to a lower bit error rate. In this case, it is perfectly possible to use a partial response maximum likelihood detector for detecting the binary data signal used for obtaining the different offset compensation signals, and to use a simple bit-by-bit detector for controlling a multiplexer used for selecting the appropriate offset compensation signal.

According to another aspect of the invention an offset compensator for compensating an offset in an asymmetric reproduction signal, the offset compensator comprising an offset compensation signal generator for generating an offset compensation signal and a subtractor for subtracting the offset compensation signal from the reproduction signal, further comprises a binary data signal detector for generating a binary data signal from the asymmetric reproduction signal, whereby the binary data signal is used for obtaining the offset compensation signal.

Such an offset compensator has the advantage that it works much more reliable than an offset compensator using the digital reproduction signal for obtaining the offset compensation signal.

Favorably, the offset compensator further comprises a shortest run-length detector for detecting the shortest run-length components of the binary data signal for obtaining the offset compensation signal. The shortest run-length detector will generate an enable signal for enabling the offset compensation every time a shortest run-length component is detected. In addition, a detector for other run-length components can also be advantageously provided.

Advantageously, the offset compensator further comprises delay means for delaying the asymmetric reproduction signal before obtaining the offset compensation signal and/or before subtracting the offset compensation signal from the reproduction signal. In this way possible delays caused by signal processing in the binary data signal detector and/or in the shortest run-length detector are taken into account, so that the enable signal, and correspondingly the asymmetry compensation signal, coincides exactly with the shortest run-length samples of the reproduction signal. A register chain can, for example, be used as a delay means. Of course, other delay means can also be used. In case another run-length is detected, corresponding delay means can also be advantageously provided.

Favorably, the offset compensator comprises means for centering the asymmetric reproduction signal with regard to the digital zero before generating the binary data signal. A possible centering means is a slicer, which even without compensating the offset centers the reproduction sufficiently for a reliable run-length detection until the offset compensation has settled to a final offset compensation signal.

According to one embodiment of the invention the offset compensator preferably uses a partial response maximum likelihood detector or a bit-by-bit detector for generating the binary data signal. While the partial response maximum likelihood detector, e.g. a partial response equalizer in combination with a Viterbi detector, delivers a lower bit error rate and has a higher performance, the bit-by-bit detector is less expensive and simplifies the necessary delay of the reproduction signal samples. Of course, other type of binary data signal detectors can also be used.

Favorably, a plurality of run-length detectors is used for detecting a plurality of run-length of the binary data signal for obtaining run-length dependent offset compensation signals and for enabling the offset compensation accordingly. In this way the offset can be compensated for any desired run-length, leading to an even more reliable data detection.

According to the invention, an apparatus for reading from and/or writing to recording media performs a method or comprises an offset compensator according to the invention. Such an apparatus has the advantage that it allows a more reliable data detection and hence a lower bit error rate upon reproduction of high-density optical recording media.

BRIEF DESCRIPTION OF THE DRAWINGS

For a better understanding of the invention, exemplary embodiments are specified in the following description of advantageous configurations with reference to the figures. It is understood that the invention is not limited to these exemplary embodiments and that specified features can also expediently be combined and/or modified without departing from the scope of the present invention. In the figures.

DETAILED DESCRIPTION OF PREFERRED EMBODIMENTS

Figure 1:
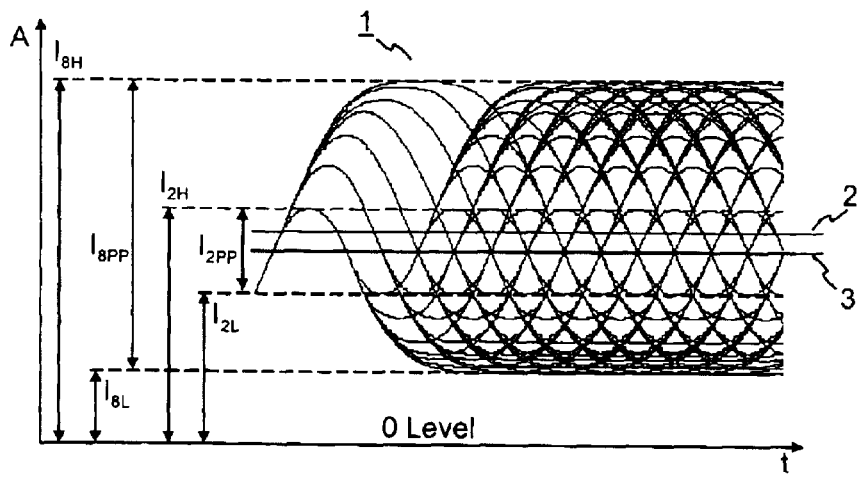
FIG. 1 shows an asymmetric eye-pattern with the different run-length components.

FIG. 1 shows an asymmetric eye-pattern 1 as obtained by reproducing data from an optical recording medium. Shown is the amplitude A of the signal against the time t. As can be seen from the figure, the peak to peak value $I_{8pp}$ of the longest run length components, i.e. the difference between the highest level $I_{8H}$ and the lowest level $I_{8L}$, is much larger than the corresponding peak to peak value $I_{2pp}$ of the shortest run-length components, which is calculated accordingly from the highest level $I_{2H}$ and the lowest level $I_{2L}$ of the shortest run-length component. This difference is mainly caused by the steep drop of the modulation transfer function, i.e. the considerable attenuation of the high frequency components compared to the low frequency components. Furthermore, it can be seen from the figure that the mid-level 2 of longest run-length components differs noticeably from the mid-level 3 of the shortest run-length components. This asymmetry is caused by non-linearity of the reproduction signal. Since the eye-pattern 1 is nearly closed, this asymmetry is a severe limitation for a reliable data detection.

Figure 2:
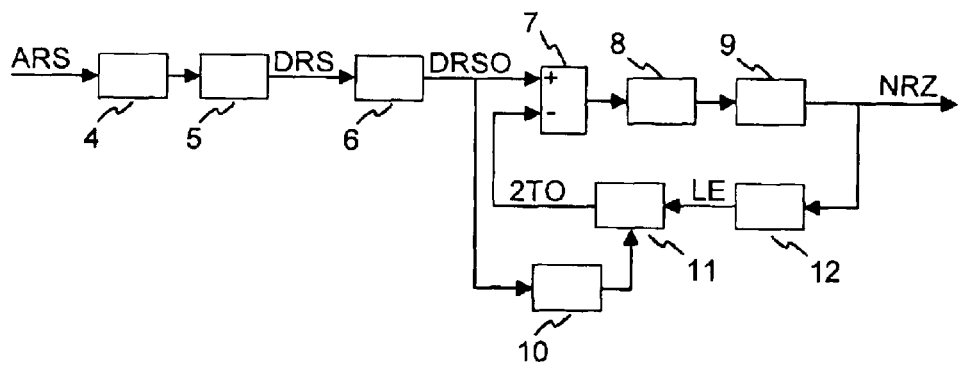
FIG. 2 shows a block diagram of an offset compensator according to the invention.

FIG. 2 shows a block diagram of an offset compensator according to the invention. The analog reproduction signal ARS is converted to the digital domain with an analog to digital converter (ADC) 4. Optional analog pre-equalization and/or low pass filtering in order to prevent aliasing is omitted in the figure for the sake of simplicity. Also not shown is the bit clock recovery phase locked loop (PLL) for clocking of the ADC and the digital logic. The converted reproduction signal is optionally passed through a digital pre-equalizer 5 for a moderate amplification of the high frequency components.

Figure 3:
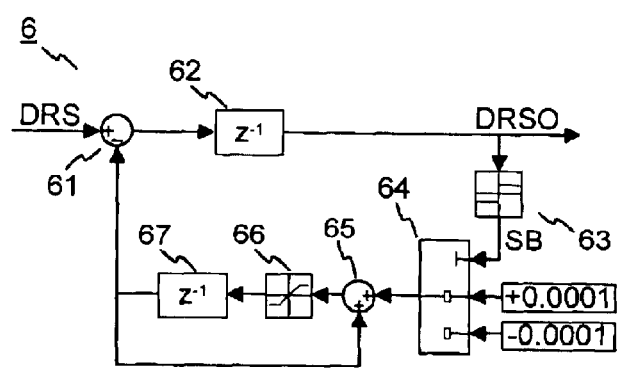
FIG. 3 shows a slicer for centering the digital reproduction signal with regard to a digital zero.

The digital reproduction signal DRS is passed through a slicer 6, which is shown in more detail in FIG. 3, where it is centered around the digital zero level. This is sufficient for a reliable run-length detection until the offset compensation circuit 11 has settled to a final 2T offset compensation signal 2TO.

The centered digital reproduction signal DRSO with the remaining offset is equalized to a so called partial response target by a partial response equalizer 8 and processed with a Viterbi detector 9. The Viterbi detector 9 delivers a non-return to zero data stream NRZ at its output. The combination of the partial response equalizer 8 and the Viterbi detector 9 constitutes a partial response maximum likelihood detector. Since such a detector not only analyses a single bit but a sequence of bits, it is capable of delivering a bit error rate which is sufficient for detecting the 2T offset compensation signal 2TO.

Figure 4:
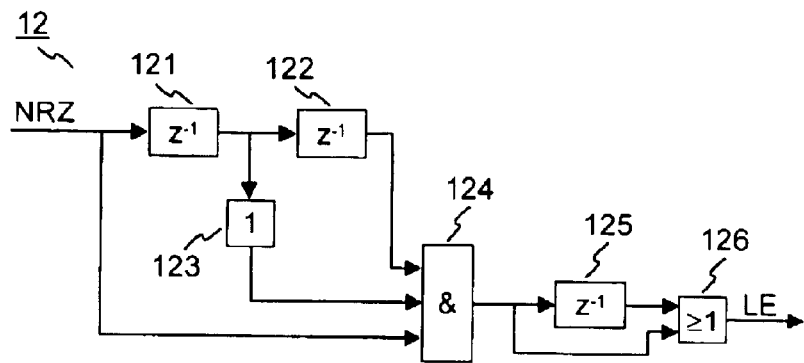
FIG. 4 shows a run-length detection circuit for a run-length of 2T.

The NRZ data stream is passed to the shortest run-length detection circuit 12 shown in more detail in FIG. 4, which generates a loop enable signal LE for the compensation circuit 11. This signal LE is high whenever a 2T run-length component is detected. The digital reproduction signal DRSO coming from the slicer 6 is delayed with a register chain 10 in order to compensate for the processing delay of the partial response equalizer 8, the Viterbi detector 9 and the run-length detection circuit 12. In this way, the 2T components coincide exactly with the loop enable signal LE at the input of the offset compensation circuit 11. The offset compensation circuit 11 outputs an offset compensation signal 2TO, which is subtracted from the centered digital reproduction signal DRSO by a subtractor 7 and adjusted until the final zero level has been placed exactly in the middle of the shortest run-length amplitude.

In FIG. 3 a slicer 6 for centering the digital reproduction signal DRS with regard to a digital zero is shown. The digital reproduction signal DRS passes a delay 62 and is fed to a sign bit detector 63 for detecting the sign bit SB of the digital reproduction signal DRS. Depending on the sign bit SB, either a positive value (+0.0001) or a negative value (−0.0001) is output by a multiplexer 64. The output signal of the multiplexer passes a limiter 66 and a storage element 67. The output signal of the storage element 67 is on the one hand added to the output signal of the multiplexer 64 by an adder 65 and on the other hand subtracted from the digital reproduction signal DRS by a subtractor 61. The limiter 66 serves to keep the output signal of the storage element 67 within predetermined limits.

FIG. 4 shows a run-length detection circuit 12 for a run-length of 2T. Three signals are fed to an AND-gate 124. The first signal is the binary data stream NRZ. The second signal is the binary data stream NRZ passed through a first delay 121 and a NOT-gate 123. The third signal is the binary data stream NRZ passed through the first delay 121 and a second delay 122. The output of the AND-gate 124 is on the one hand fed to an OR-gate 126 and on the other hand fed to the OR-gate 126 through a third delay 125. The circuit 11, therefore, emits a "1" if a 2T component is found in the binary data stream NRZ. In this case the loop enable signal LE is active during two clock cycles. Otherwise the output signal is "0", i.e. the loop enable signal LE is passive. For other run-lengths the detection circuits operate correspondingly.

Figure 5:
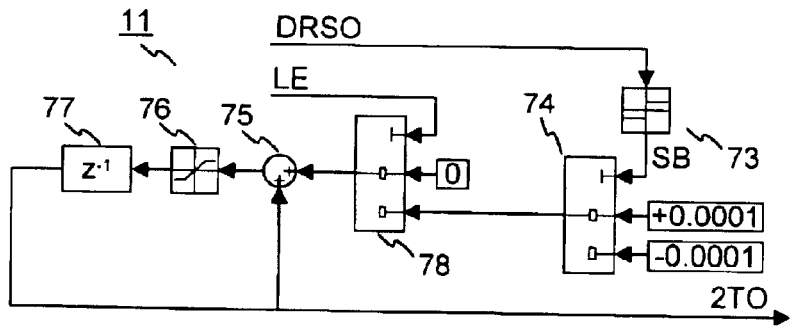
FIG. 5 shows a circuit for obtaining an offset compensation signal.

In FIG. 5 a circuit 11 for obtaining an offset compensation signal 2TO for the shortest run-length component 2T is shown. The circuit 11 is largely similar to the slicer 6 shown in FIG. 3, i.e. it comprises a sign bit detector 73, a multiplexer 74, an adder 75, a limiter 76, and a storage element 77. However, the circuit 11 comprises an additional multiplexer 78, which is controlled by the loop enable signal LE emitted by the run-length detection circuit 12 shown in FIG. 4. If the loop enable signal LE is passive, the additional multiplexer 78 outputs a zero value. If the loop enable signal LE is active, the additional multiplexer 78 outputs the output signal of the multiplexer 74. Therefore, the offset compensation signal 2TO is only updated if a shortest run-length component 2T is detected.

Figure 6:
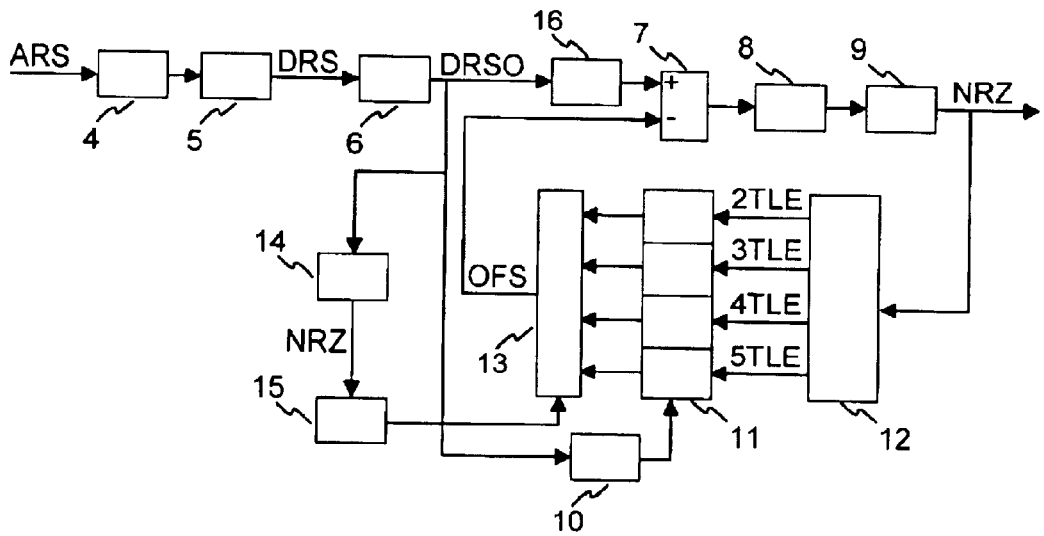
FIG. 6 shows a block diagram of a multiple run-length offset compensator.

FIG. 6 shows a block diagram of a multiple run-length offset compensator. The offset compensator corresponds largely to the offset compensator shown in FIG. 2. However, in this case the run-length detector 12 is capable of detecting run-lengths from 2T to 5T. In addition, a further delay element 16 is introduced between the slicer 6 and the subtractor 7. For each detected run-length component the detector 12 will send a corresponding loop enable signal 2TLE to 5TLE to the offset compensating circuit 11. This circuit 11 is capable of generating an offset compensation signal for each run-length component. A multiplexer 13 is used for selecting the appropriate offset compensation signal OFS for each signal sample. For this purpose, the centered digital reproduction signal DRSO is passed to a bit by bit detector 14, which delivers at its output a non-return to zero data stream NRZ. This data stream NRZ is fed to a further run-length detector 15, which controls the multiplexer 13. The further delay element 16 is necessary to compensate for the processing time needed for the run-length detection by the run-length detector 15. In this way, the offset is compensated not only for the shortest run-length but selectively also for other run-lengths, which are allowed by the channel modulation.

Figure 7:
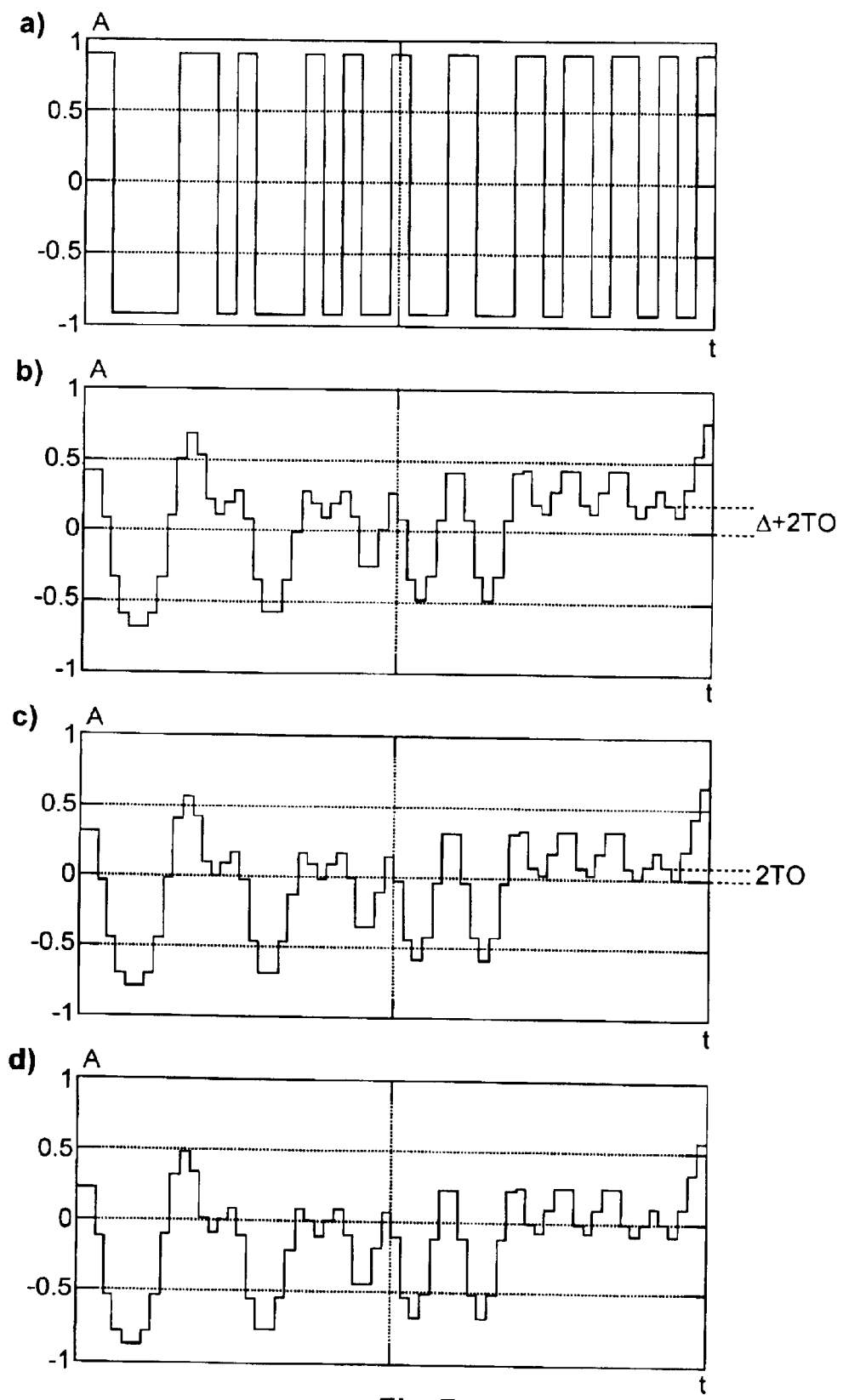
FIG. 7 shows exemplary signals at different stages of offset compensation.

FIG. 7 shows exemplary signals at different stages of offset compensation. Shown is the amplitude A of the signals against the time t. All signals have been normalized to a maximum amplitude value of "1" for the sake of clarity. FIG. 7a shows the ideal reproduction signal, which corresponds to the marks and spaces on the optical recording medium. In FIG. 7b the digital reproduction signal DRS after the analog to digital converter 4, but before the slicer 6 is shown. The signal DRS is not centered with regard to the digital zero line. Instead, it has an offset Δ, which can be removed by the slicer 6, and a further offset 2TO caused by the asymmetry in the eye-pattern 1, which cannot be removed by the slicer 6. FIG. 7c shows the digital reproduction signal DRSO after the slicer 6. As can be seen in the figure, the offset Δ has been removed. However, the further offset 2TO caused by the asymmetry in the eye-pattern 1 is still present. In FIG. 7d, the digital reproduction signal after offset compensation is shown. The further offset 2TO has been removed by subtracting the offset compensation signal 2TO from the digital reproduction signal DRSO.

What is claimed is:

1. Method for compensating an offset in an asymmetric reproduction signal (DRSO), whereby an offset compensation signal (OFS) is subtracted from the reproduction signal (DRSO), the offset compensation signal being generated by an offset compensator, characterized in that it comprises the steps of:

detecting a binary data signal (NRZ) from the asymmetric reproduction signal (DRSO); and using the binary data signal (NRZ) for obtaining the offset compensation signal (OFS).

2. Method according to claim 1, further comprising the step of detecting the shortest run-length components of the binary data signal (NRZ) for obtaining the offset compensation signal (OFS).

3. Method according to claim 1, further comprising the step of delaying the asymmetric reproduction signal (DRSO) before obtaining the offset compensation signal (OFS) and/or before subtracting the offset compensation signal (OFS) from the reproduction signal (DRSO).

4. Method according to claim 1, further comprising the step of centering the asymmetric reproduction signal (DRSO) with regard to a digital zero line before detecting the binary data signal (NRZ).

5. Method according to claim 1, wherein a partial response maximum likelihood detector (8,9) or a bit-by-bit detector (9) is used for detecting the binary data signal (NRZ).

6. Method according to claim 1, wherein a plurality of run-lengths of the binary data signal (NRZ) are detected for obtaining run-length dependent offset compensation signals (OFS) and for enabling the offset compensation accordingly.

7. Offset compensator for compensating an offset in an asymmetric reproduction signal (DRSO), the offset compensator comprising an offset compensation signal generator (11) for generating an offset compensation signal (OFS), and a subtractor (7) for subtracting the offset compensation signal (OFS) from the reproduction signal (DRSO), characterized in that it further comprises a binary data signal detector (8,9) for generating a binary data signal (NRZ) from the asymmetric reproduction signal (DRSO), the binary data signal (NRZ) being used for obtaining the offset compensation signal (OFS).

8. Offset compensator according to claim 7, further comprising a shortest run-length detector (12) for detecting the shortest run-length components of the binary data signal (NRZ) for obtaining the offset compensation signal (OFS).

9. Offset compensator according to claim 7, further comprising delay means (10) for delaying the asymmetric reproduction signal (DRSO) before obtaining the offset compensation signal (OFS) and/or before subtracting the offset compensation signal (OFS) from the reproduction signal (DRSO).

10. Offset compensator according to claim 7, further comprising means (6) for centering the asymmetric reproduction signal (DRSO) with regard to a digital zero line before generating the binary data signal (NRZ).

11. Offset compensator according to claim 7, further comprising a partial response maximum likelihood detector (8,9) or a bit-by-bit detector (9) for generating the binary data signal NRZ.

12. Offset compensator according to claim 7, further comprising a plurality of run-length detectors (12) for detecting a plurality of run-lengths of the binary data signal (NRZ) for obtaining run-length dependent offset compensation signals (OFS) and for enabling the offset compensation accordingly.

13. Apparatus for reading from and/or writing to optical recording media, characterized in that it performs a method according to any of claims 1–6 or comprises an offset compensator according to any of claims 7–12.

* * * * *